United States Patent [19]
Sutula, Jr.

[11] Patent Number: 5,499,581
[45] Date of Patent: Mar. 19, 1996

[54] MOLDED ARTICLE HAVING INTEGRAL DISPLACEABLE MEMBER OR MEMBERS AND METHOD OF USE

[75] Inventor: Daniel P. Sutula, Jr., Bristol, Conn.

[73] Assignee: The Ensign-Bickford Company, Simsbury, Conn.

[21] Appl. No.: 249,522

[22] Filed: May 26, 1994

[51] Int. Cl.$^6$ .................................................. C06C 5/06
[52] U.S. Cl. ................ 102/275.12; 102/275.7; 102/312
[58] Field of Search ............ 102/275.12, 275.7, 102/275.4, 275.5, 275.2, 312

[56] References Cited

U.S. PATENT DOCUMENTS

| | | |
|---|---|---|
| 3,205,818 | 9/1965 | Coulson . |
| 3,349,706 | 10/1967 | Schaumann . |
| 3,889,703 | 6/1975 | Keathley ..................... 137/67 |
| 3,987,732 | 10/1976 | Spraggs et al. . |
| 4,137,930 | 2/1979 | Scholle ................. 137/614.03 |
| 4,239,003 | 12/1980 | Savitt . |
| 4,248,152 | 2/1981 | Yunan . |
| 4,424,747 | 1/1984 | Yunan ..................... 102/275.2 |
| 4,714,017 | 12/1987 | Kelly et al. ............. 102/275.3 |
| 4,714,018 | 12/1987 | Lofgren .................. 102/275.7 |
| 4,722,279 | 2/1988 | Yunan .................... 102/275.4 |
| 4,815,382 | 3/1989 | Yunan .................... 102/275.7 |
| 4,889,299 | 12/1989 | Sarton et al. .............. 248/72 |
| 5,171,935 | 12/1992 | Michna et al. .......... 102/275.7 |
| 5,204,492 | 4/1993 | Jacob et al. ........... 102/275.12 |

FOREIGN PATENT DOCUMENTS

| | | |
|---|---|---|
| 1203121 | 4/1986 | Canada . |
| 0500512 | 8/1992 | European Pat. Off. . |
| 2684752 | 6/1993 | France ................. 102/275.7 |

*Primary Examiner*—Stephen M. Johnson
*Attorney, Agent, or Firm*—Victor E. Libert; Frederick A. Spaeth

[57] ABSTRACT

A molded plastic article such as a connector block for connecting signal transmission lines in a blasting system, includes a body member having a channel formed therein for receiving and retaining a mountable member, such as a detonator, and a displaceable locking member connected to the body member by one or more frangible webs which retain the displaceable locking member in a first position aligned with, but displaced from, its locking position. The mountable member, e.g., a detonator, is inserted into the channel of the connector block and a force is applied to the displaceable member to rupture the frangible web or webs and move the locking member through a passageway in the block for locking engagement with the detonator to retain the detonator therein. Flexible, cantilevered line retaining means may be disposed on the body member to receive one or a plurality of outgoing signal transmission lines. A method of assembling a mountable member within the article, is also provided. The molded plastic article may be any other suitable device, such as a tool handle in which a tool blade is secured in the same manner as the detonator is secured in the connector block.

27 Claims, 8 Drawing Sheets

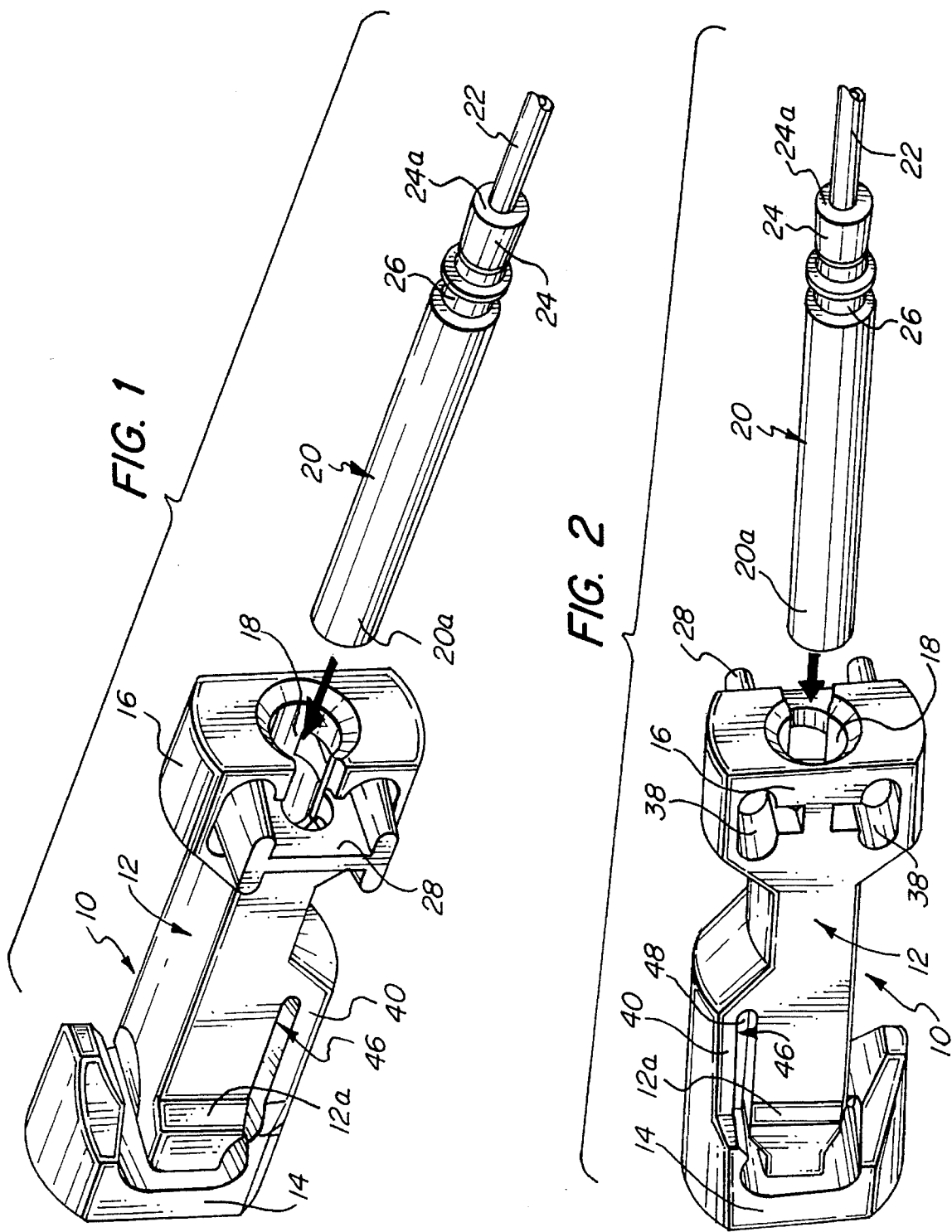

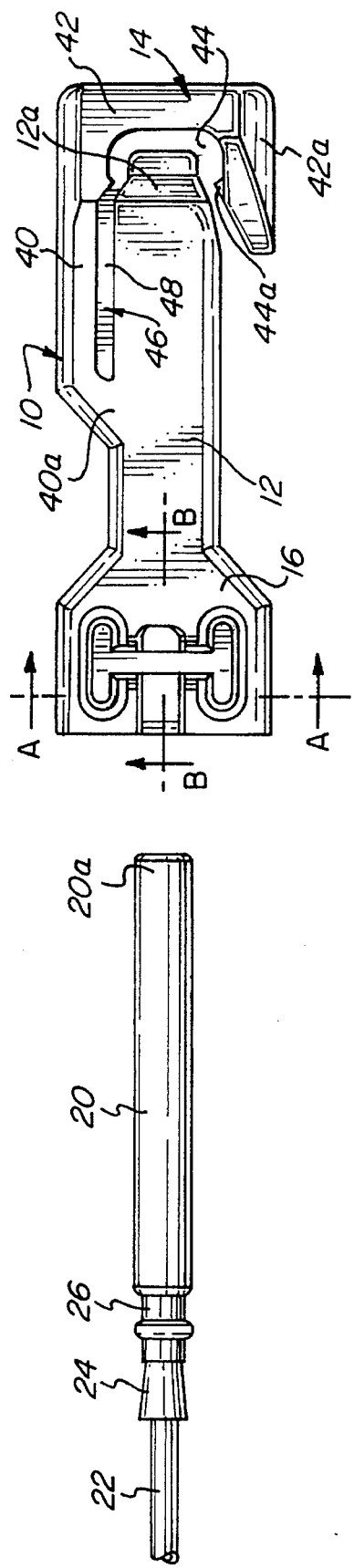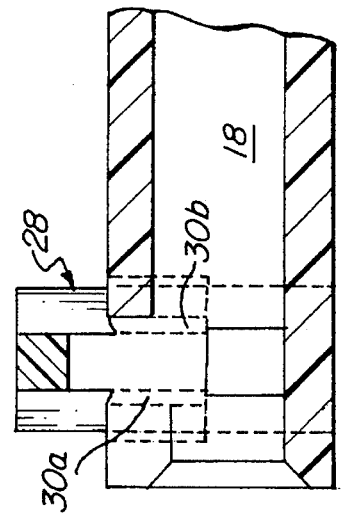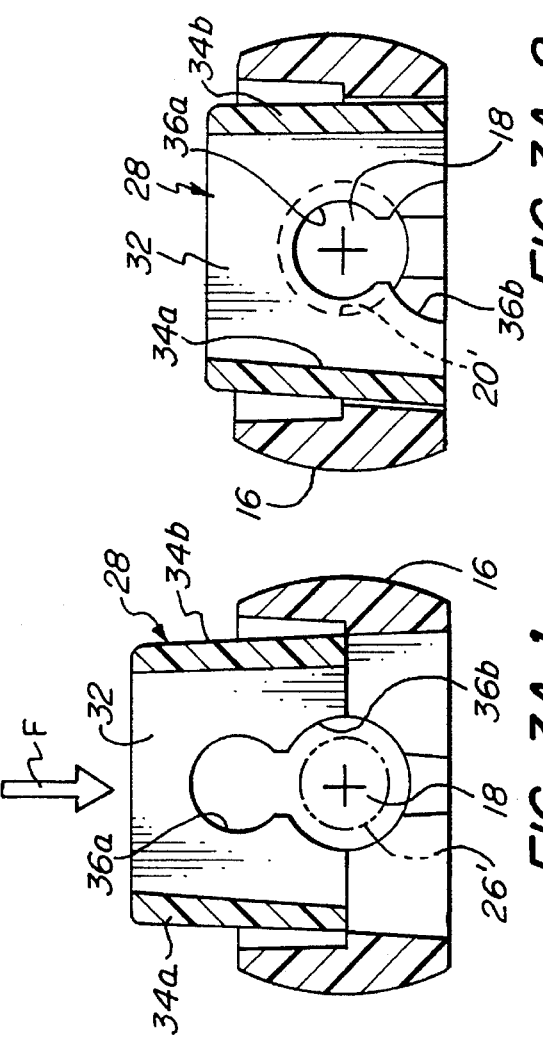

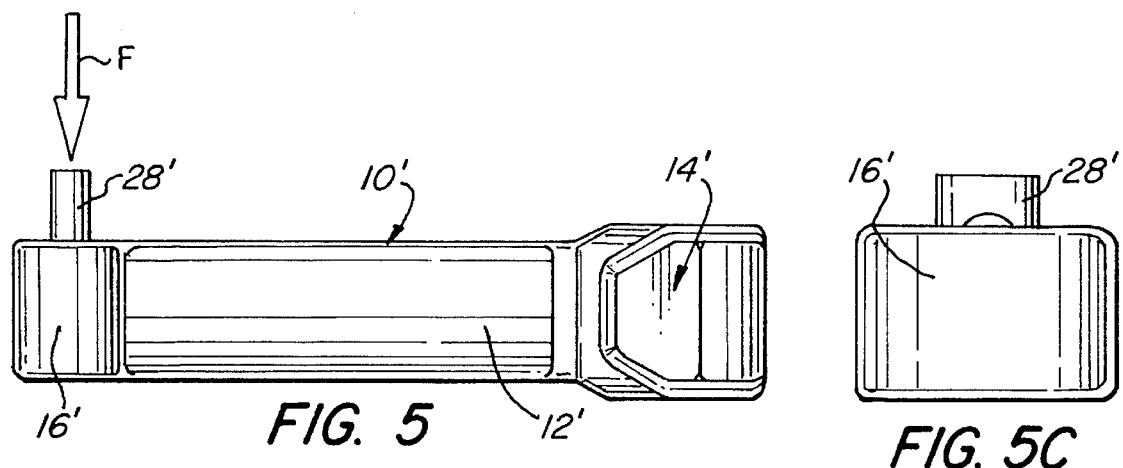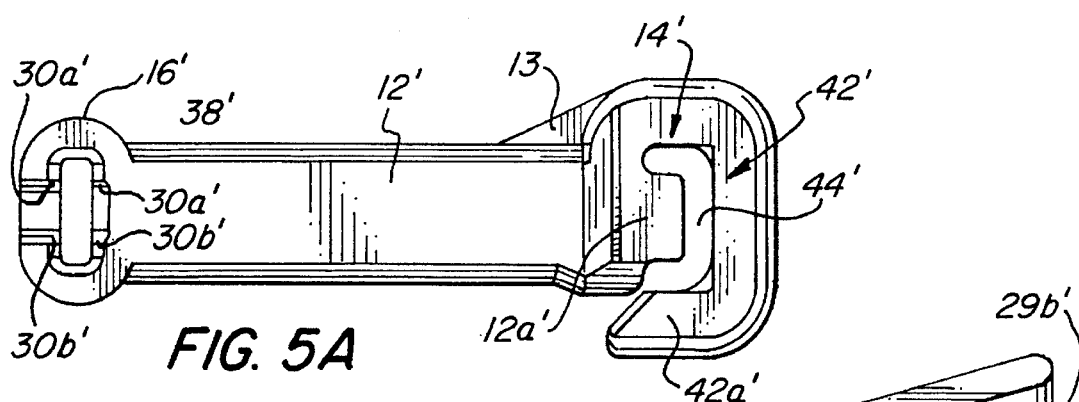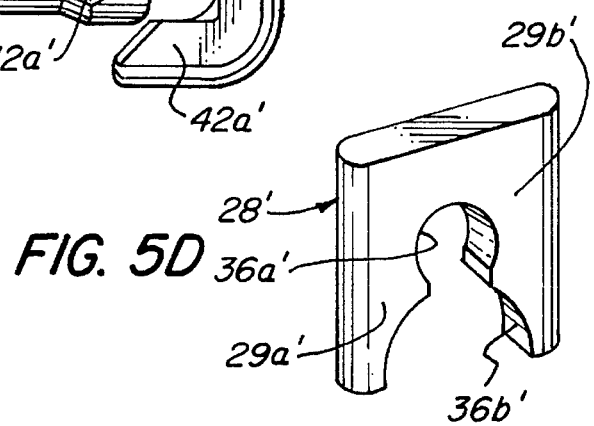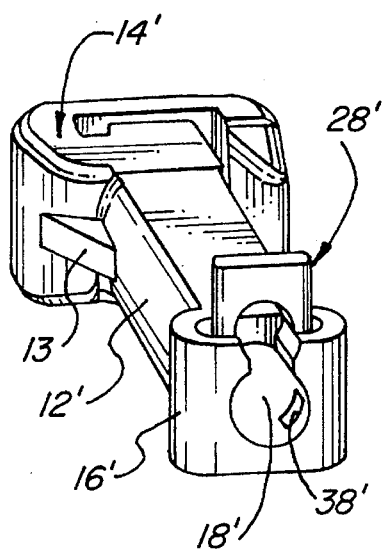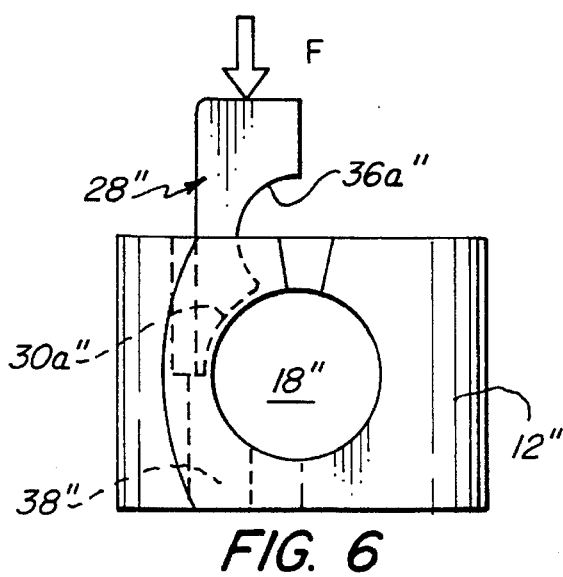

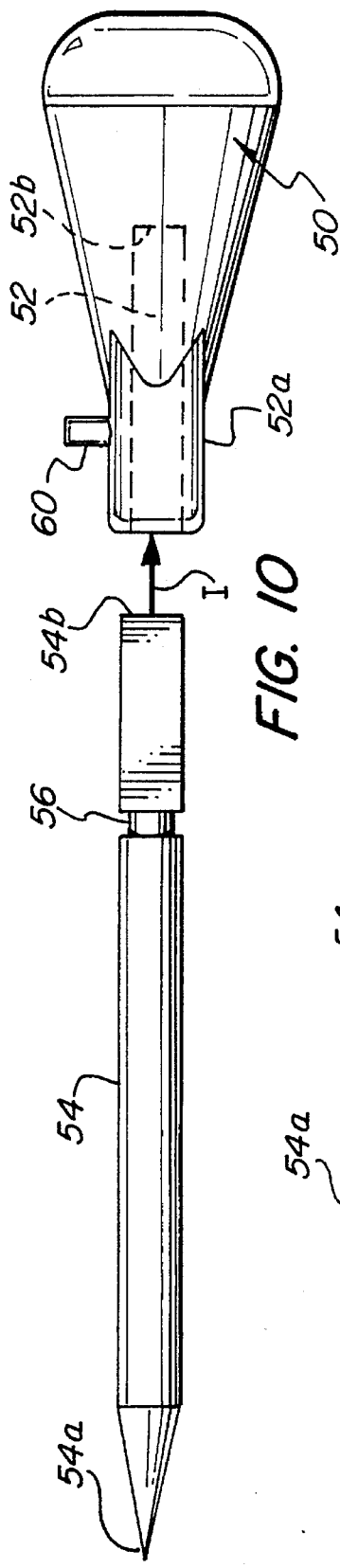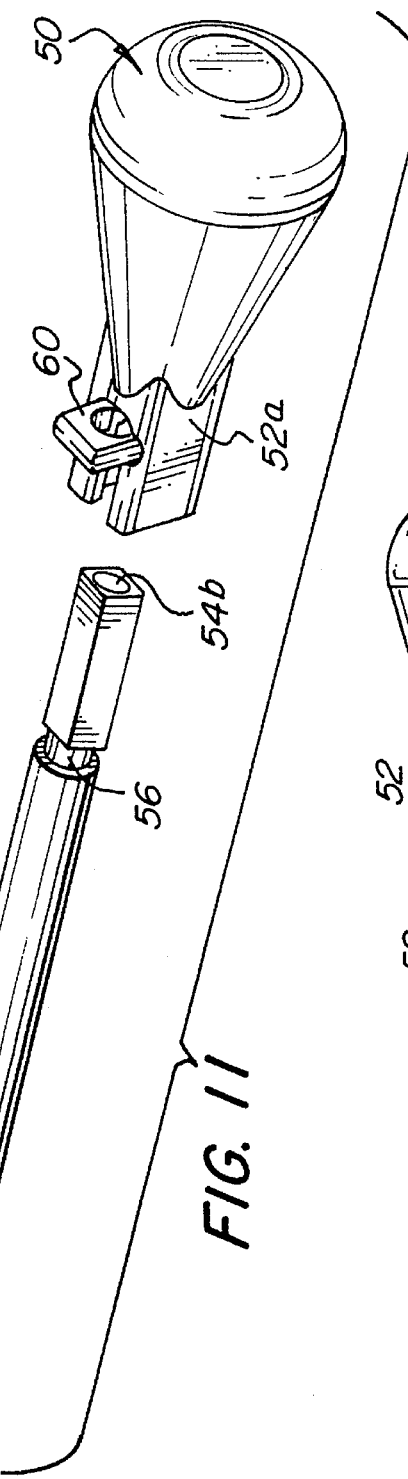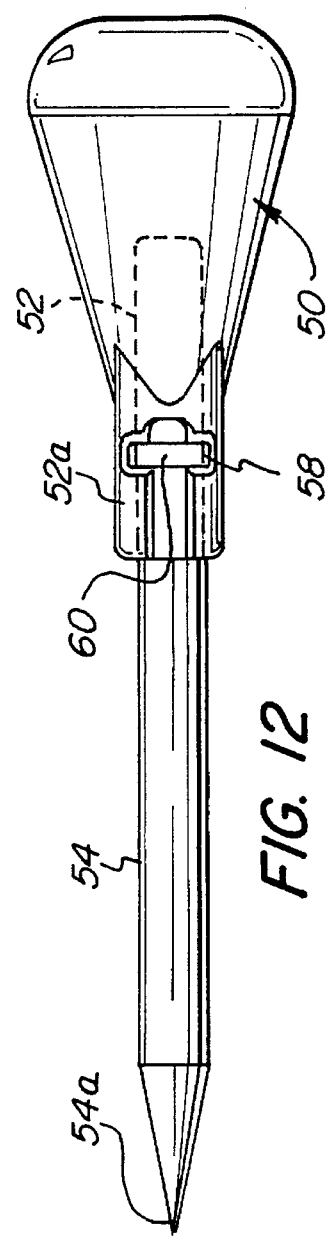

MOLDED ARTICLE HAVING INTEGRAL DISPLACEABLE MEMBER OR MEMBERS AND METHOD OF USE

BACKGROUND OF THE INVENTION

1. Field of the Invention

The present invention relates to molded plastic parts having one or more displaceable members integrally molded therewith and which are displaceable by rupturing a frangible web or webs which connects the displaceable member to the main body member. More particularly, the present invention is concerned with a molded plastic connector block of the type utilized to connect and initiate detonation signal transmission lines, the connector block including an integrally molded displaceable member.

2. Description of the Related Art

Connector blocks for blasting initiation systems are well-known in the art as exemplified by U.S. Pat. No. 5,171,935 of R. J. Michna et al, issued Dec. 15, 1992. That Patent discloses a connector block having a channel formed therein for receiving a low energy detonator and an arcuate slot within which one or more signal transmission lines are retained in signal transmission juxtaposition with the detonator.

European Patent Application 0 500 512 A2 of V. Lindqvist et al discloses a connector block for signal transmission lines which is of cylindrical configuration and, as disclosed at column 11, lines 16–20 and illustrated in FIG. 6A, provides a detonator compartment having a head portion 69 formed with a hole 70 therein for insertion of a locking part, not shown in the drawing, which serves to prevent axial withdrawal of the detonator.

Connector devices which include pins or other members which are integrally molded to the main body of the connector are shown in the prior art. For example, U.S. Pat. No. 3,349,706 to E. J. Schaumann, issued Oct. 31, 1967, shows a connector for positioning detonating fuse and a delay device in operative relationship to each other so that a detonation stimulus can be propagated from one to the other. The structure illustrated in the drawings of this Patent shows a body of thermoplastic material having a central tubular portion 1 and including tapered pins 4 integrally connected by a thin flexible web 5 to the main body as described at column 2, line 38 et seq. The thin connecting webs 5 retain the pins with the body but are flexible enough to enable the pin to be rotated and inserted into an aperture provided for the purpose. Similar construction is shown in U.S. Pat. No. 4,424,747 of M. E. Yunan, issued Jan. 10, 1984. As described at column 6, line 26 et seq, pins 22 and 23 are integrally connected to sections 1B and 1C of the connector 1 by thin flexible webs of plastic 24 and 25, respectively.

U.S. Pat. No. 4,248,152 to M. E. Yunan, issued Feb. 3, 1981, discloses an explosive booster capable of being connected to donor and receiving detonating cords which include a slotted locking means 21 which appears to have an integrally molded hinge to enable locking means 21 to be rotated to form a closure with slot 17 to lock a trunk-line in place. See FIG. 2 and column 5, lines 60–62.

SUMMARY OF THE INVENTION

In accordance with the present invention there is provided a molded plastic article comprising a body member having receiving means which are dimensioned and configured to receive and retain therein a mountable member having first engagement means formed thereon. The body member includes at least one displaceable member having second engagement means formed thereon, the displaceable member being integrally molded with the body member and connected thereto by frangible web means. The web means retain the displaceable member in a first position in which the displaceable member is aligned with but displaced from a locking position. When the displaceable member is in its locking position, the second engagement means of the displaceable member engages the first engagement means of the mountable member. The displaceable member is displaceable from its first position to its locking position by application of force to the displaceable member to rupture the frangible web means and move the displaceable member to force the first and second engagement means into locking engagement with each other.

One aspect of the invention provides for a combination of the molded plastic article with a mountable member received within the receiving means and wherein the frangible web means have been ruptured and the displaceable member is in its locking position.

In another aspect of the present invention, the body member further comprises a passageway formed therein for movement therethrough of the displaceable member from its first position to its locking position.

Another aspect of the present invention provides that the receiving means of the body member comprises a bore formed within the body member and the mountable member comprises a cylindrical part dimensioned and configured to be received within the bore.

In a particular aspect of the present invention, the body member comprises a handle member, such as a tool handle, and the mountable member comprises a shaft, such as the shaft of a tool, on which the handle member is mounted.

In another particular aspect of the present invention, the mountable member comprises a detonator and the first engagement means comprises a crimp formed in the detonator.

In accordance with another aspect of the present invention the above-described molded plastic article comprises a molded plastic connector block for retaining one or more signal transmission lines in signal transfer relationship with a detonator. The connector block comprises the following components. A body member has a signal transmission end and a channel formed in the body member for receiving and retaining therein a detonator having an output end, with the output end of the detonator disposed at the signal transmission end of the body member. A line retaining means is disposed at the signal transmission end of the body member for retaining therein at least one signal transmission line in signal communication relationship with the output end of a detonator retained within the receiving channel. A displaceable locking member is integrally molded with the body member and is connected thereto by frangible web means which retain the displaceable locking member in a first position in which the locking member is aligned with, but displaced from, a locking position in which the locking member secures the detonator within the channel. The locking member is displaceable from its first position to its locking position by application of force to the locking member to rupture the frangible web means and move the displaceable member to force the locking member into its locking position.

Yet another aspect of the present invention is independent of the presence of a displaceable member as described above. In this aspect, the line retaining means comprises a gripping member spaced from the signal transmission end of the body member to form a slot between the gripping member and the signal transmission end of the body member, the slot having an opening thereto and being otherwise dimensioned and configured to receive and retain therein up to a plurality of signal transmission lines in signal communication relationship with a detonator disposed in the channel. The gripping member has a supported end extending from the body member and a distal end which terminates in a return-bend leg which overlaps at least a portion of the length of the body member from the signal transmission end thereof and is disposed on the side of the body member opposite the side from which the supported end extends.

In accordance with another aspect of the present invention, there is provided a method of mounting a mountable member having first engagement means thereon in a molded plastic body member which comprises receiving means which are dimensioned and configured to receive and retain therein the mountable member. The method comprises providing a molded plastic article comprising the body member and at least one displaceable member having second engagement means formed thereon. The displaceable member is integrally molded with the body member and connnected thereto by frangible web means which retain the displaceable member in a first position in which the displaceable member is aligned with, but displaced from, a locking position in which the second engagement means of the displaceable member engages the first engagement means of the mountable member. The method also comprises rupturing the frangible web means and moving the displaceable member along a travel path into contact with the mountable member so as to force the first and second engagement means into locking engagement with each other.

In accordance with yet another aspect of the present invention there is provided a connector block for retaining one or more signal transmission lines in signal transfer relationship with a detonator. The connector block comprises the following components. A body member has a signal transmission end and a channel formed in the body member for receiving a detonator having an output end. Means are carried on the body member to retain such detonator within the channel with the output end of the detonator disposed at the signal transmission end of the body member. A resilient, cantilevered member comprises a shank which has a fixed end extending from one side of the body member at a support location on the body member which is remote from the signal transmission end thereof. The shank has an opposite end which carries a gripping member spaced from the signal transmission end of the body member to form a slot between the gripping member and the signal transmission end of the body member. The slot so formed is dimensioned and configured to receive and retain therein a plurality of signal transmission lines in signal communication relationship with a detonator disposed in the channel as aforesaid.

In accordance with another aspect of the present invention, the gripping member has a supported end extending from the shank and a distal end which terminates in a return-bend leg which extends along at least a portion of the length of the body member from the signal transmission end thereof. The return-bend leg is disposed on the side of the body member opposite the side from which the shank extends.

In yet another aspect of the present invention, the shank is spaced from the body member and extends generally parallel thereto to define a slot extending between the shank and the body member.

Other aspects of the present invention will be apparent from the following description and the appended drawings.

BRIEF DESCRIPTION OF THE DRAWINGS

FIG. 1 is a perspective view of a connector block in accordance with one embodiment of the present invention having a displaceable member integrally molded therewith in its first position and showing a detonator aligned with the connector block in preparation for insertion therein;

FIG. 2 is a perspective view of the connector block and aligned detonator of FIG. 1 taken at a different angle and showing the opposite side of the connector block;

FIG. 3 is a top view of the connector block and aligned detonator of FIGS. 1 and 2;

FIG. 3A-1 is a section view, enlarged relative to FIG. 3, taken along line A—A of FIG. 3 and showing the displaceable member in its first position;

FIG. 3A-2 is a view corresponding to FIG. 3A-1 but showing the displaceable member in its locking position;

FIG. 3B is a partial section view taken along line B—B of FIG. 3;

FIG. 5 is a side view of a connector block comprising another embodiment of the present invention;

FIG. 5A is a top view of the connector block of FIG. 5;

FIG. 5B is a perspective end view of the connector block of FIG. 5;

FIG. 5C is an end view of the connector block of FIG. 5;

FIG. 5D is an exploded, perspective view of the displaceable member of the connector block of FIG. 5;

FIG. 6 is a schematic end view of a connector block comprising another embodiment of the present invention showing a wedge-type displaceable member;

FIG. 7B-1 is a section view, enlarged relative to FIG. 7, taken along line B-B of FIG. 7 and showing the displaceable locking member in its first position;

FIG. 7B-2 is a view corresponding to FIG. 7B-1 but showing the displaceable member in its locking position;

FIG. 10 is an elevation view of an awl handle and its associated awl shaft, in disassembled condition, comprising still another embodiment of the present invention;

FIG. 11 is a perspective view of the disassembled awl shaft and handle of FIG. 10; and FIG. 12 is a view showing the components of FIG. 10 assembled into an awl.

DETAILED DESCRIPTION OF THE INVENTION AND PREFERRED EMBODIMENTS THEREOF

Figures 1, 7B:
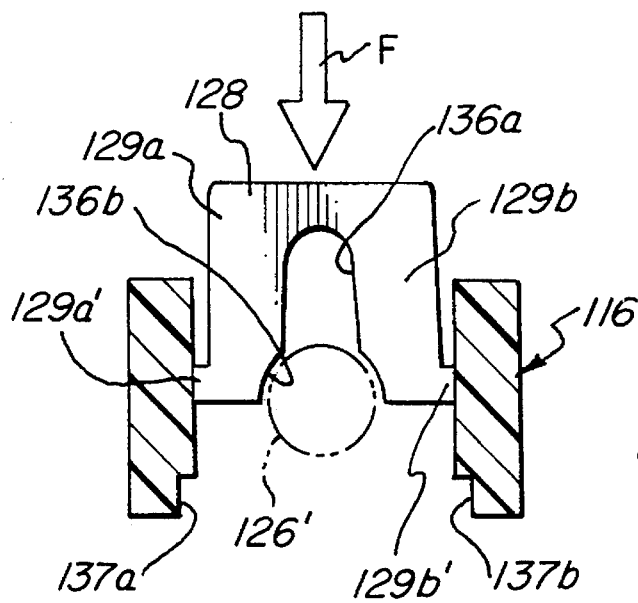

Molded synthetic organic polymeric ("plastic") articles comprising a body member having a displaceable member integrally molded therewith provide an efficient and inexpensive way to assemble a mountable member onto or into the body member. One of a wide variety of devices in which such an article is useful are connector blocks of the type utilized in blasting initiation systems. In blasting initiation systems such connector blocks are typically utilized to have mounted therein a low energy detonator and to receive and retain one or more signal transmission lines in signal transmission juxtaposition with the detonator. As is well-known, the detonator has a signal transmission line crimped into it and an initiation signal is transmitted through the signal transmission line to detonate the detonator, thereby initiating an outgoing signal in the one or more signal transmission lines retained within the connector block. These outgoing signal transmission lines may terminate in detonators positioned at various locations to either initiate signals in other signal transmission lines or to detonate main explosive charges into which the detonators have been inserted. Typically, as is well-known in the art, the main explosive charges will be contained within bore holes drilled in the ground or in the face of a mine and arranged to give a desired blasting pattern. If the remote detonators are to be used to initiate signals in other signal transmission lines, such remote detonators may be placed within other connector blocks which receive and retain the next or next series of signal transmission lines. Connector blocks are normally utilized on the surface and the use of low energy detonators in the connector blocks reduces noise and the generation of shrapnel. Shrapnel may cut a surface signal transmission line before the signal reaches the point at which the line is cut, thereby interrupting transmission of the signal and disrupting the blasting pattern. The detonators used within the connector blocks, sometimes referred to as signal detonators or low energy detonators, and the detonators associated with the main explosive charges, sometimes referred to as high energy or downhole detonators, may include delay trains to provide a selected millisecond delay between arrival of the signal at the detonator and detonation of the charge contained within the detonator, all as is well-known in the art.

One well-known form of construction is to provide a signal or low energy detonator within a connector block with a length of signal transmission tube crimped therein. A high energy or downhole detonator is crimped at the opposite end of the length of signal transmission tube. This construction provides a self-contained, factory assembled unit which is sealed against moisture or other environmental contamination entering into the detonators. These assemblies may be readily field-connected to other like assemblies or otherwise arranged to provide great flexibility in establishing blasting patterns. The signal transmission line is typically signal transmission tubing comprising hollow plastic tubing on the inside of which is either contained a reactive material such as a mixture of a high brisance explosive and aluminum powder ("shock tube") or a low velocity signal transmission ("LVST") tube comprising a hollow plastic tube, the inner surface of which is coated with a deflagrating material. Any suitable signal transmission line may be used in conjunction with the connector blocks of the present invention, such as shock tube, LVST tube or low energy detonating cord. Such signal transmission lines are of course well-known in the art.

Figures 2, 7B:
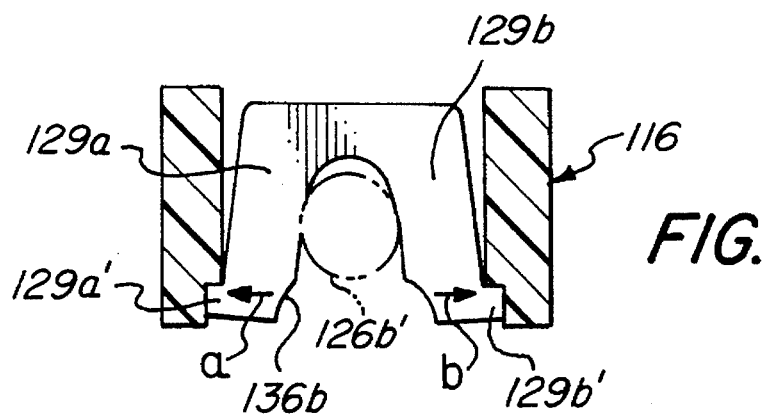
Figure 3C:
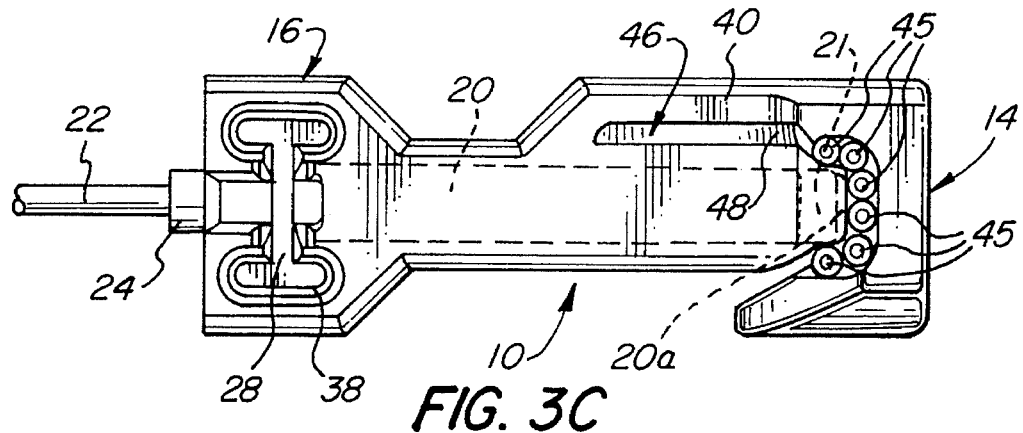
FIG. 3C is a view corresponding to that of FIG. 3 but showing the detonator inserted within the connector block and retained therein with the displaceable member in its locked position, and a plurality of outgoing signal transmission tubes retained by the connector block.
Figure 3D:
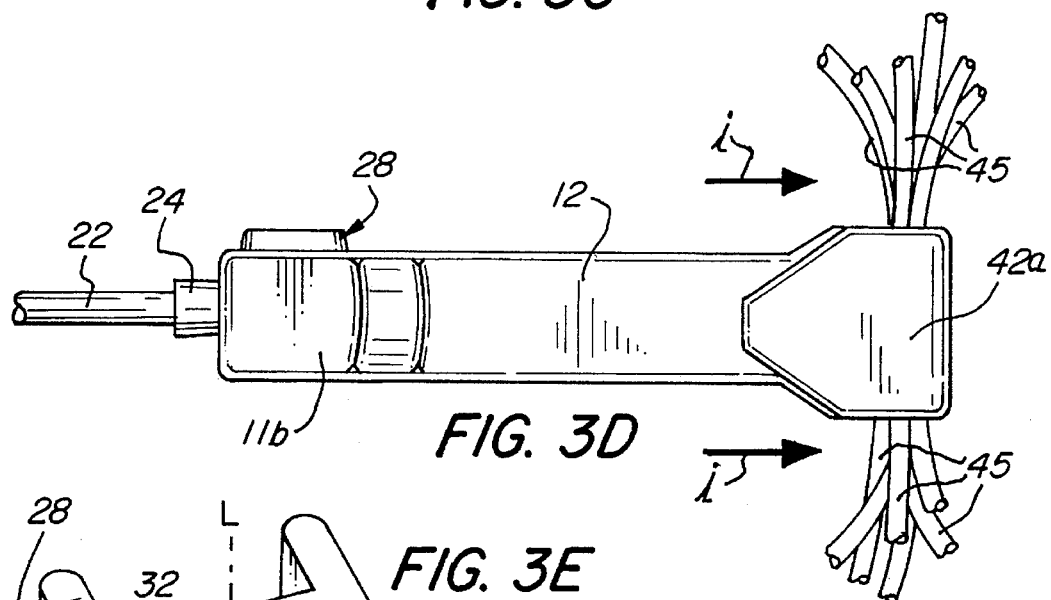
FIG. 3D is a side view of the connector block of FIG. 3C.
Figure 3E:
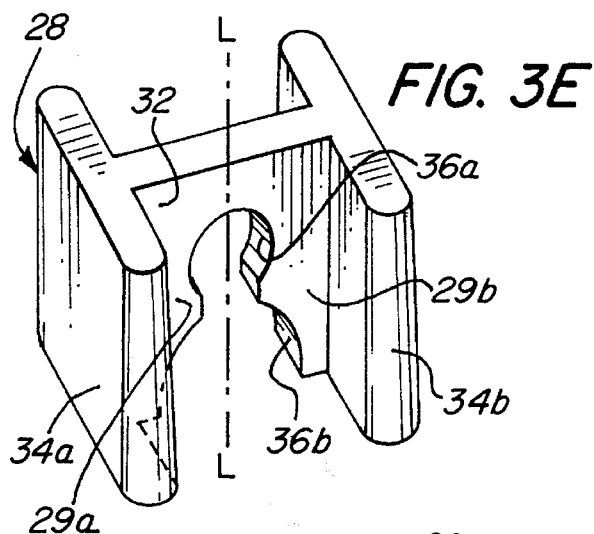
FIG. 3E is an exploded perspective view of the displaceable member of the connector block of FIGS. 1–3.
Figure 4A:
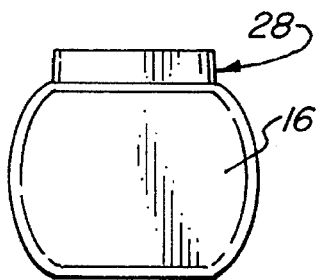
FIG. 4A is an end view of the connector block of FIGS. 1–3.
Figure 4:
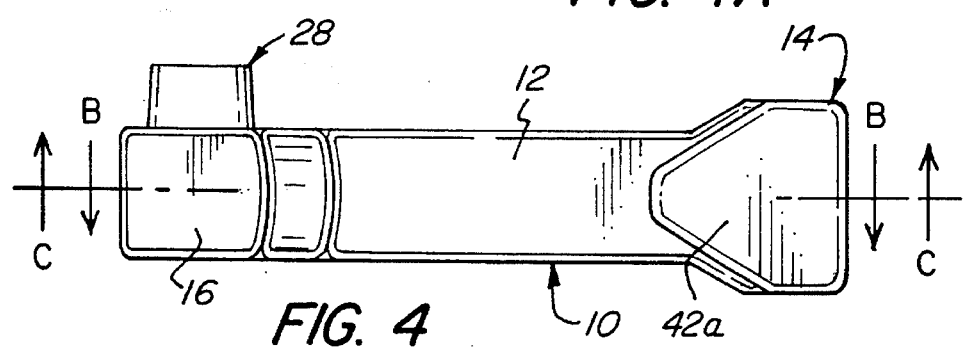
FIG. 4 is a side view of the connector block of FIGS. 1–3.
Figure 4B:
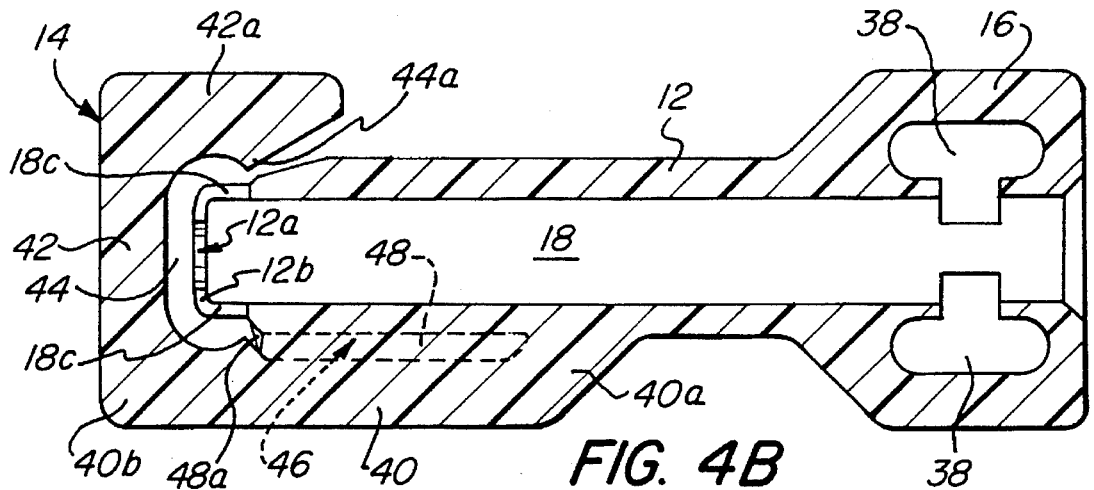
FIG. 4B is a cross-sectional view, enlarged with respect to FIG. 4, taken along line B—B of FIG. 4.
Figure 4C:
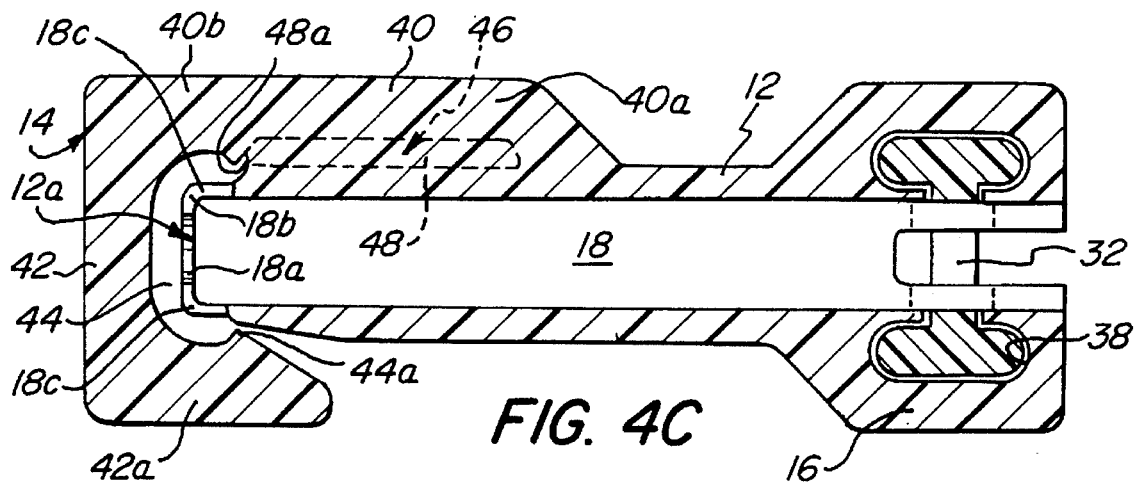
FIG. 4C is a cross-sectional view, enlarged with respect to FIG. 4, taken along line C—C of FIG. 4.
Figure 4D:
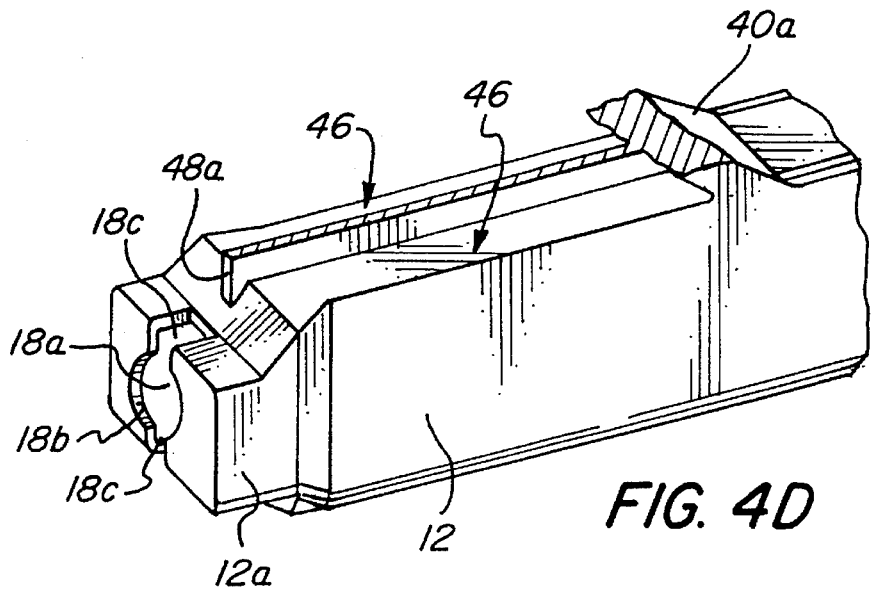
FIG. 4D is a perspective, partial view, with parts broken away, of the body member portion of the connector block of FIGS. 1–3.
Figure 7:
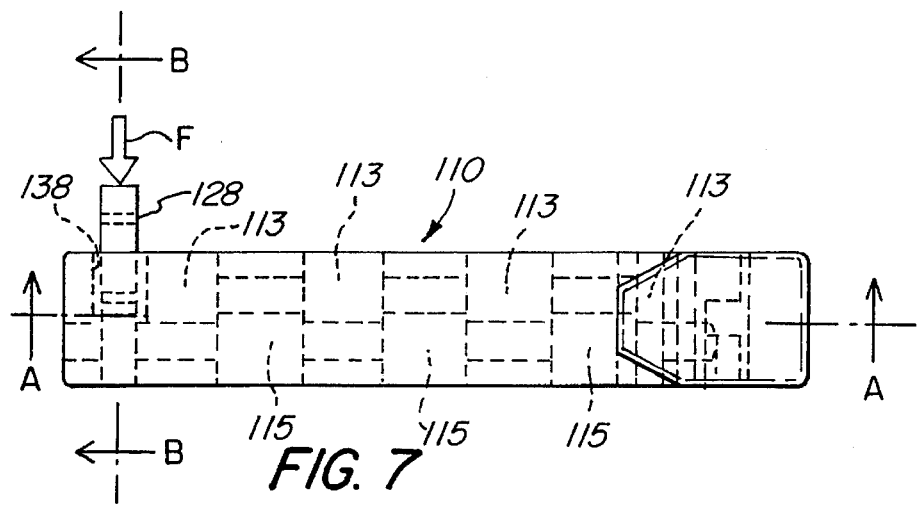
FIG. 7 is a schematic side view of a connector block comprising yet another embodiment of the present invention.
Figure 7A:
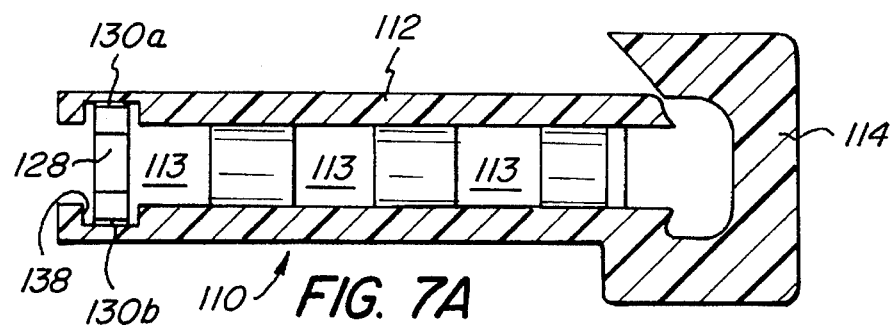
FIG. 7A is a cross-sectional view taken along line A—A of FIG. 7.
Figure 8:
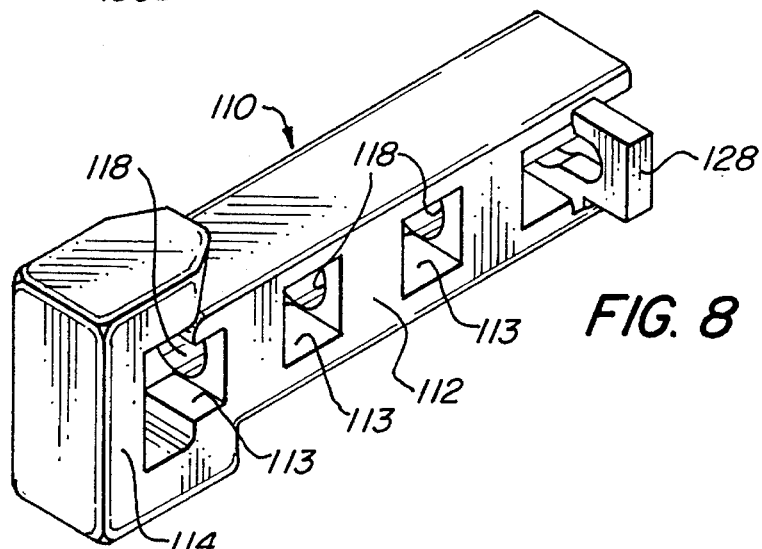
FIG. 8 is a perspective view of the connector block of FIG. 7.
Figure 9:
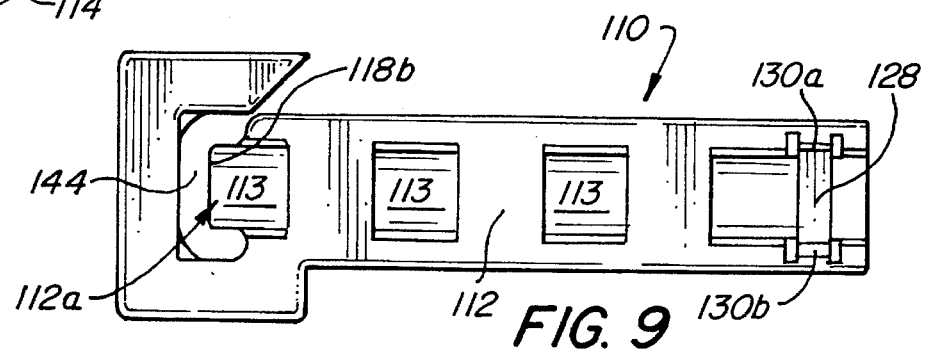
FIG. 9 is a side view of the connector block of FIG. 7.

Referring now to FIGS. 1 and 2 there is shown a molded plastic article comprising a connector block 10 comprised of a body member 12 having a signal transmission end 12a, a line retaining means 14 disposed at the signal transmission end 12a of body member 12, and a housing 16 at the opposite end of body member 12. In the illustrated embodiment, the receiving means comprises a channel 18 (best seen in FIGS. 4B and 4C) which extends through body member 12 and is dimensioned and configured to receive therein a mountable member comprising, in this case, a low energy or signal-transmitting detonator 20 (FIGS. 1 and 2). Preferably, channel 18 is sized relative to detonator 20 so that detonator 20 can be readily slidably received within channel 18 by either hand or machine assembly. Channel 18 is, in the embodiment of FIGS. 1–4D, circular in cross section but it could have any suitable cross-sectional shape, e.g., polygonal, as long as the detonator can be readily inserted and maintained within the channel. For example, the channel 18 could be considerably larger in diameter than detonator 20 but formed with a plurality of longitudinally extending ribs disposed radially about the cross section of the channel and sized to slidably receive, and support, the detonator. In any case, the channel 18 terminates in an opening 18a (FIGS. 4B, 4C and 4D) at the signal transmission end 12a of body member 12. Opposite radial portions of opening 18a, as seen in FIG. 4D, extend longitudinally through signal transmission end 12a to provide a pair of opposed firing notches 18c. Notches 18c serve to expose those shock tubes 45 (FIG. 3C) which are retained at the opposite ends of arcuate slot 44 directly to the output end 20a (the explosive-containing end, as described below) of detonator 20. By thus preventing shielding of the end-positioned shock tubes 45 (FIG. 3C) from the small explosive charge of output end 20a, reliability of signal transmission to all the shock tubes 45 retained within arcuate slot 44 is enhanced. The segments of opening 18a between firing notches 18c define web segments which serve as a stop member 18b (FIGS. 4B, 4C and 4D) for the detonator 20 when it is inserted into channel 18. The centrally positioned shock tubes 45 are of course directly exposed to output end 20a by opening 18a. Such direct exposure is important in view of the small explosive charge contained in detonators typically used in connector blocks, as described below.

Detonator 20 is of conventional construction and comprises a cylindrical tube, which may be made of a metal such as aluminum, or of a suitable plastic (a synthetic organic polymeric material). Detonator 20 has an output end 20a within which is received an explosive charge 21 (FIG. 3C), typically about 1 to 3 grains (64.8 to 194.4 mg) of an explosive such as lead azide, preferably not more than 5 grains (324 mg) of such explosive. These are rather small explosive charges as compared to detonator caps conventionally used to detonate main explosive charges, which typically contain about 9.25 to 14.66 grams (600 to 950 mg) of explosive.

Detonator 20 would typically include a delay train of a suitable pyrotechnic material interposed between the explosive charge 21 located at output end 20a, and a signal transmission line 22 which is received within a resilient bushing 24 about which a sealing crimp 26 is formed. Bushing 24 has an exposed end face 24a. Sealing crimp 26 provides a first engagement means on the mountable member which, in the illustrated embodiment, is provided by detonator 20. It will be appreciated that signal transmission line 22, which is broken away in FIGS. 1 and 2, may have a typical length of from about 8 to 200 feet, and at its end opposite the end crimped into detonator 20, may be crimped into a high energy detonator (not shown) suitable for use in initiating detonation of a main explosive charge. This is the type of arrangement illustrated in U.S. Pat. No. 3,987,732 of R. W. Spraggs et al, issued Oct. 26, 1976. Obviously, the connector block of the invention may also be used in any other suitable blasting system connection.

A displaceable member comprises, in the illustrated embodiment, a displaceable locking member 28 which is integrally molded with the body member 12 and connected thereto by frangible web means 30a, 30b as seen in FIG. 3B. That is, body member 12, frangible webs 30a, 30b and displaceable locking member 28 are all formed as a single, integral unit in a suitable mold. The frangible web means 30a, 30b form an integral connection between housing 16 and displaceable locking member 28. As best seen in FIG. 3E, displaceable locking member 28 is configured somewhat in the manner of an I-beam comprising a beam web member 32 and a pair of flanges 34a, 34b. Beam web member 32 is cut away in the pattern of a pair of intersecting segments of circles with a smaller circular segment 36a intersecting with a larger circular segment 36b, the two circular segments cooperating to provide second engagement means of displaceable locking member 28. Circular segments 36a, 36b divide displaceable locking member 28 into a pair of spaced-apart legs 29a, 29b. The circular segments could, of course, be of any other suitable shape, for example, they could be segments of polygonal, e.g., octagonal, shaped openings.

Housing 16 has formed therein a passageway 38 (FIGS. 2, 4B and 4C) which is shaped approximately congruently to displaceable locking member 28 so that the latter may move therethrough in a sliding motion along the longitudinal axis L—L (FIG. 3E) of displaceable locking member 28. In its integrally molded first position, locking member 28 extends into an initial segment of passageway 38. The channel 18 divides the passageway 38 into two segments, so that passageway 38 could be considered to be two aligned passageways on radially opposite sides of channel 18. In any case, passageway 38 provides a cavity within which locking member 28 is received and retained when it is displaced to its locking position as described below.

Line retaining means 14 comprises in the illustrated embodiment a cantilevered member comprising a shank 40 (FIGS. 1, 2, 4B and 4C) having a fixed end 40a (FIGS. 4B and 4C) extending from one side of the body member 12.

Shank 40 is spaced from body member 12 to provide a longitudinal slot 46 which extends generally parallel to or at a small angle to the longitudinal axis of channel 18 for a portion of its length between fixed end 40a and a point near signal transmission end 12a of body member 12. A longitudinally extending web 48, best seen in FIG. 4D, extends along the center of slot 46 and connects shank 40 to body member 12. Web 48 extends from fixed end 40a of shank 40 and terminates in a web end 48a which, as best seen in FIGS. 4B and 4C, is located at the inner end of arcuate slot 44. Shank 40 is supported on body member 12 at a support location 40a which is located remotely from signal transmission end 12a in a direction towards housing 16. The opposite end 40b of shank 40 carries thereon a gripping member 42, the inner portion of which is spaced from signal transmission end 12a to form therebetween a slot 44. Slot 44 is of arcuate configuration when viewed in profile as shown in FIGS. 3C, 4B and 4C and, in the illustrated embodiment, is generally C-shaped in profile having short portions which extend parallel to the longitudinal axis of channel 18 and a somewhat longer portion which extends transversely of the longitudinal axis of channel 18. At the tube entry end of slot 44, gripping member 42 has a wedge-shaped (in profile as viewed in FIGS. 3, 4B and 4C) fence portion 44a which extends along the width thereof to provide a narrowed gap entryway into arcuate slot 44. The thickness of gripping member 42 helps to reduce or eliminate shrapnel engendered by detonation of detonator 20.

Figure 1A:
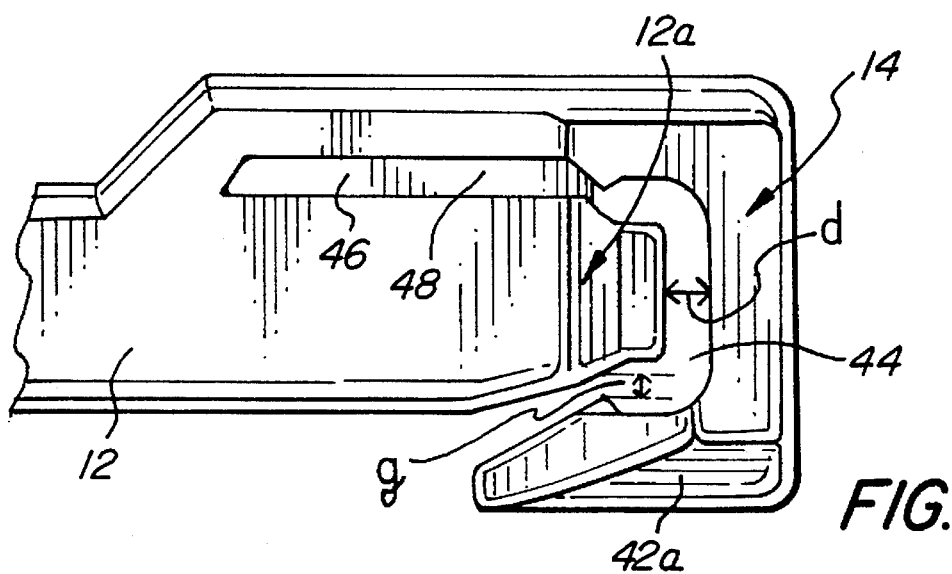
FIG. 1A is a top view enlarged relative to FIG. 1, of the line-retaining end of the connector block of FIG. 1.

A plurality of signal transmission lines comprising, in the illustrated embodiment, shock tubes 45 are shown (FIGS. 3C and 3D) received within arcuate slot 44. One or a plurality of signal transmission tubes may be inserted into slot 44. It will be appreciated that only a short segment of shock tubes 45 are illustrated in FIG. 3D and the shock tubes 45 are seen only in cross-section in FIG. 3C. In practice, the shock tubes 45 may extend for greater or lesser distances, typically, from a few feet to many hundreds of feet or more. Because the shock tubes 45 may be of great length, or may be connected at their opposite ends to other components of a blasting system, the shock tubes 45 are conventionally not threaded through arcuate slot 44 like thread through the eye of a needle, but are placed within arcuate slot 44 by being forced in a direction transverse to the longitudinal axis of the shock tube 45 through the narrow entry gap, as indicated by the arrows i in FIG. 3D. Such insertion is facilitated by the hook-like configuration of gripping member 42. Desirably, gap g (FIG. 1A) is smaller than the depth d of arcuate slot 44 to help retain shock tubes 45 in place. In any case, shock tubes 45 comprise part of a blasting system in which the ends of one or more of shock tubes 45 may be crimped into detonator caps associated with booster or main explosive charges (neither such detonator caps nor explosive charges being shown). Alternatively or in addition, one or more of shock tubes 45 may, like shock tube 22, be crimped into signal transmitting detonator caps contained in other connector blocks (not shown) similar or identical to connector block 10. It will be noted that the arcuate configuration of slot 44 maintains each of the tubes in close, signal transmission juxtaposition with the explosive charge 21 contained at the output end 20a of detonator 20. It will further be noted that web end 48a prevents the innermost of shock tubes 45 from entering into slot 46 wherein they could be too far from output end 20a of the detonator 20 received within channel 18 to assure reliable initiation of a signal within a shock tube 45. Fence portion 44a narrows the entryway into arcuate slot 44 and closes that end of slot 44 against inadvertent withdrawal or escape of a shock tube 45 therefrom. The width of the opening at fence portion 44a is desirably somewhat less than the diameter of the shock tube 45 so that when a shock tube is forced past the narrow opening into slot 44, the gripping member 42 deflects slightly and/or the shock tube is compressed slightly, to provide a force-fit entry of the tube past fence 44a. The shock tubes 45 are thus secured against escape from arcuate slot 44. This is especially important during set-up of the blasting system, when significant tensile forces may be imposed on shock tubes 45 as they are played out to remote connections, and upon detonation when shifting earth and rock may also impose significant tensile forces on the shock tubes 45.

Gripping member 42 terminates in a return-bend leg 42a which overlaps a portion of the length of the body member 12 from the signal transmission end 12a thereof. Return-bend leg 42a is disposed on the side of the body member 12 opposite the side from which the shank 40 extends and overlaps signal transmission end 12a of body member 20. As will be appreciated from FIGS. 1, 2, 4B and 4C, the overall configuration of cantilevered line retaining means 14 is roughly J-shaped, approximating the shape of a fishhook.

By supporting shank 40 at a location on body member 12 which is located remotely from signal transmission end 12a thereof, and by stiffening shank 40 by connecting it by web 48 to body member 12, the amount of pivoting imposed on gripping member 42 by the explosion of detonator 20 is limited. Even if web 48 ruptures upon detonation of detonator 20, it will in this way absorb some of the energy of the explosion. Pivoting movement of gripping member 42 may also be limited by the overlap of return-bend leg 42a about signal transmission end 12a of body member 12. By limiting pivoting of gripping member 42 in response to the detonation of detonator 20, the shock tubes 45 are better retained in signal-transmitting juxtaposition with output end 20a of detonator 20.

In order to mount detonator 20 within connector block 10, detonator 20 is inserted into channel 18 through housing 16, as indicated by the unnumbered arrows in FIGS. 1 and 2. As noted above, channel 18 is dimensioned and configured to readily slidably receive detonator 20 therein with the output end 20a of detonator 20 abutting against stop member 18b provided by the annular web of opening 18a located at the signal transmission end 12a of body member 12. When so positioned, crimp 26 of detonator 20 will be aligned with beam web member 32.

FIG. 3A-1 shows displaceable locking member 28 in its integrally molded, first position. Larger circular segment 36b is about the same diameter as the outside diameter of detonator 20, so that circular segment 36b is aligned with the walls of channel 18 and detonator 20 can slide past larger circular segment 36b to be fully seated within channel 18. Smaller circular segment 36a is about the same diameter as crimp 26 of detonator 20. With detonator 20 thus positioned by stop member 18b, a force is applied against displaceable locking member 28 in the direction towards detonator 20, as indicated by the arrow F in FIG. 3A-1. The applied force is sufficient to rupture frangible web means 30a, 30b (FIG. 3B) and force displaceable locking member 28 into its locking position as shown in FIG. 3A-2. Smaller circular segment 36a has a closed circumference which is greater than 180°, e.g., about 275°. Consequently, the open circumferential portion of the circle of which segment 36a is a part is less than 180°, e.g., 85°, so that the (flattened) apices formed at the intersection of segments 36a and 36b must flex outwardly as locking member 28 is forced over the crimp 26 of detonator 20, and the apices snap back into place as the apices pass over the radial center of crimp 26. In this manner, displaceable locking member 28 is forced into an over-center, snap-fit engagement with crimp 26 of detonator 20, so that locking member 28 is thereby seated within passageway 38 and it and detonator 20 are firmly locked in position within connector block 10.

The travel of displaceable locking member 28 within passageway 38 is along a line coincident with the longitudinal axis L—L (FIG. 3E) of displaceable locking member 28. Passageway 38 provides a guide means to guide displaceable locking member 28 into place without need to turn or tip displaceable locking member 28, or otherwise cause it to deviate from its straight line travel. A comparison of FIGS. 3A-1 and 3A-2 shows the travel distance of displaceable locking member 28 between its first and locking positions. The unnumbered cross-hair lines in FIGS. 3A-1 and 3A-2 indicate at their intersection the point location of the central longitudinal axis of detonator 20 and the coincident central longitudinal axis of channel 18. The dash line circle 26' in FIG. 3A-1 shows the cross-sectional outside diameter and location of crimp 26 of detonator 20 when detonator 20 is seated within channel 18. The dash line circle 20' in FIG. 3A-2 shows the cross-sectional outside diameter and location of the uncrimped portion of detonator 20 when it is seated within channel 18.

While as shown in FIG. 3A-2, the displaceable locking member 28 protrudes slightly from housing 16 when in its locking position, locking member 28 could obviously be made shorter so that in its locking position it is flush with or recessed relative to the surface of housing 16, as illustrated in the embodiment of FIG. 7B-2, discussed below.

It will be appreciated that by integrally molding displaceable member 28 as part of connector block 10, displaceable member 28 is perfectly aligned with passageway 38, and assembly of displaceable locking member 28 into locking engagement with detonator 20 is greatly facilitated as compared to a situation in which the locking member is a separate piece. If locking member 28 were molded as a separate piece it would require the manipulation of a rather small piece which, if made of a plastic material such as medium or high density polyethylene or some other suitable synthetic organic polymeric material, would be somewhat slippery and difficult to handle. (Medium or high density polyethylene is a preferred material for the connector block 10.) The small, separate locking piece would have to be properly positioned and aligned with passageway 38 and held in place while a force as indicated by the arrow F in FIG. 3A-1 is applied. These difficulties are avoided by the integral molding of displaceable member 28 as part of connector block 10, the frangible web means 30a, 30b perfectly aligning and holding displaceable locking member 28 in place relative to passageway 38 until sufficient force is applied to rupture frangible webs 30a, 30b and force the displaceable locking member 28 from its first position (FIG. 3A-1) through passageway 38 to its locking position (FIG. 3A-2).

It should be appreciated that although the crimp 26 on detonator 20 (FIGS. 1 and 2) provides a convenient second locking means for engagement by displaceable member 28, it is not necessary to use that portion of the detonator as the second locking means which is engaged by the first locking means on the displaceable member 28. The housing 16 of connector block 10 could be designed, for example, to have displaceable locking member 28 engage signal transmission line 22 or bushing 24 instead of crimp 26. For example, the displaceable locking member could engage signal transmission line 22 and abut end face 24a of bushing 24 to retain detonator 20 in place.

FIGS. 5, 5A, 5B and 5C show a connector block 10' in accordance with another embodiment of the present invention comprising a body member 12', line retaining means 14' comprising a gripping member 42' including a return bend leg 42a', and a housing 16'. Housing 16' and displaceable locking member 28' are configured differently from the corresponding parts of the embodiments illustrated in FIGS. 1-4B. In this case, as best seen in FIG. 5D, displaceable locking member 28' does not have an I-beam configuration but is a flat, bar-like member which has a smaller circular segment 36a' which intersects a larger circular segment 36b' in a manner substantially identical to that of displaceable locking member 28. Segments 36a' and 36b' divide locking member 28' into a pair of spacedapart leg members 29a', 29b'. Passageway 38' is generally of rectangular configuration as seen in plan view of FIG. 5A, with rounded corners which complement the rounded corners of displaceable locking member 28', i.e., passageway 38' is shaped generally congruently to displaceable locking member 28'. Actually, as may best be appreciated from FIG. 5B, passageway 38' is interrupted by channel 18' so that passageway 38' may be considered to have a first or storage portion within which displaceable locking member 28' is retained by the frangible webs 30a', 30b'. On the radially opposite side of channel 18', the second portion of passageway 38' (the entry to one-half of which is visible in FIG. 5B) is located in axial alignment with the first or storage portion of passageway 38' so that it may receive the leading end of displaceable locking member 28' when the latter is forced from its first position to its locking position. Displaceable locking member 28' is retained in its first position by integrally molded webs, 30a', 30b' (FIG. 5A).

In the embodiment of FIGS. 5–5D, line retaining means 14' is integrally molded at the signal transmission end 12a' of body member 12' together with a strengthening gusset 13 which helps to resist the tendency of the explosive force released by detonation of a detonator 20 mounted within enclosed channel 18' to pivot line retaining means 14' about its point of joinder to body member 12' in the area where strengthening gusset 13 is located. It will be noted that arcuate slot 44' is of similar configuration to that illustrated in the embodiment of FIGS. 1–4D so that it may maintain a plurality, e.g., up to six, signal transmission lines, e.g., shock tubes, therein in a manner as illustrated in FIGS. 3C and 3D. As is the case with the other illustrated embodiments, it is seen that gripping member 42' terminates in a return-bend leg 42a' which overlaps a portion of the length of the body member 12', at signal transmission end 12a' thereof, with return-bend leg 42a' disposed on the side of the body member 12 opposite the side of body member 12 from which gripping member 42' depends. This hook shape arrangement of gripping member 42' facilitates insertion of the shock tubes 45 therein and helps to resist inadvertent withdrawal of the shock tubes from arcuate slot 44' during assembly of the blasting system or by force of the initial explosions in a blasting sequence. The hook shape feature of the gripping member and the integral molded displaceable locking member are of course features which may be present in a given connector block independently of each other.

Connector block 10' functions in exactly the same manner as described above with respect to connector block 10. Thus, after insertion of a detonator (not shown) into the channel 18' of connector block 10' and seating of the detonator fully into the channel 18', a force as indicated by the arrow F in FIG. 5 is applied to displaceable locking member 28' to rupture the frangible webs 30a', 30b' and force the displaceable locking member 28' from its first position via passageway 38' to its locking position in engagement with the sealing crimp or other suitable second engagement means (neither shown) provided on the detonator (not shown) received within channel 18'.

It will be appreciated that the connector blocks 10 and 10' are well suited for assembly line production. Thus, an operator can insert a suitable detonator 20 into the closed channel 18 or 18', the end of channel 18 or 18' at signal transmission end 12a or 12a' providing a stop which will position the detonator with its sealing crimp aligned with the beam web member or bar structure containing circular segments 36a, 36b or 36a', 36b'. With the detonator held in place, a foot pedal or other suitable device can be actuated by an operator or an automatic device can be used to actuate a punch which will apply the force indicated by the arrows F in FIGS. 3A-1 and 5 to a displaceable member (such as displaceable locking member 28 or 28') to rupture the frangible webs and drive the displaceable locking member 28 or 28' through its respective passageway 38 or 38' and into its locking position, wherein it engages and locks the detonator.

It will be further appreciated that the displaceable locking member may have any suitable configuration. For example, instead of the bifurcate construction illustrated in FIGS. 3E and 5D, as shown in FIG. 6 the displaceable locking member may be of wedge-shaped configuration as illustrated by displaceable locking member 28'' which is secured in place by a frangible web means 30a'' in the first portion of a passageway 38'' formed within a body member 12'' within which a detonator-receiving channel 18'' is formed. With the detonator received within enclosed channel 18'' a force applied in the direction of arrow F in FIG. 6 will rupture frangible web 30a'' and force displaceable locking member 28'' downwardly (as viewed in FIG. 6) so that circular segment 36a'' will be wedged against the crimp of a detonator (not shown in FIG. 6) received within channel 18''. The second or lower, as viewed in FIG. 6, portion of passageway 38'' is sized so that a wedging action is attained which forces displaceable locking member 28'' into tight-fitting engagement with the detonator received within channel 18'', thereby holding the detonator in place.

Referring now to FIGS. 7, 7A, 8 and 9, there is illustrated yet another embodiment of the present invention. In the embodiment illustrated in FIGS. 7–9, a connector block 110 comprises a body member 112 having a line retaining means 114 formed at one end thereof which is configured generally similarly to the line retaining means of the other embodiments so as to provide an arcuate slot 144, best seen in FIG. 9, for the retention of one or a plurality of signal transmission lines therein. In molding the connector block 110, a series of radial inserts are provided within the mold to form a series of "windows" 113, 115 therein. Windows 113, 115 are staggered with respect to their axial position and the result is a compartmentalized interior structure which is light, yet rigid and strong. The overlapping open portions of windows 113, 115 define a channel 118 (FIG. 8) through which a detonator such as detonator 20 of FIGS. 1 and 2 may be inserted with the closed or explosive-containing end of the detonator positioned at the stop member 118b (FIG. 9) formed at the signal transmission end 112a of body member 112.

A displaceable locking member 128 is supported within passageway 138 (FIGS. 7 and 7A) by frangible web means 130a, 130b. Use of connector block 110 is the same as that described above for the other embodiments of the invention, i.e., a suitable detonator (not shown in FIGS. 7–9) is inserted into channel 118 and the closed end of it is brought to bear against the stop member 118b, which will align the crimp 26 on the detonator 20 with the displaceable locking member 128.

The second engagement means of displaceable locking member 128 is comprised of a smaller, tapered segment 136a and a larger circular segment 136b which intersect to define legs 129a, 129b of member 128. The outside distal ends of legs 129a, 129b have thereon protrusions 129a' and 129b'. In the illustrated embodiment of FIGS. 7B-1 and 7B-2, the interior walls of passageway 138 have a pair of detents 137a, 137b formed therein. A force F is applied in the direction illustrated by the arrow in FIGS. 7 and 7B-1 to rupture the frangible webs 130a, 130b and to force the displaceable locking member 128 from its first position (FIG. 7B-1) to its locking position (FIG. 7B-2) to engage the detonator and lock it in place within the channel 118. In FIGS. 7B-1 and 7B-2 dash line circle 126' shows the cross-sectional outside diameter and location of crimp 26 of detonator 20 when detonator 20 is seated within channel 118. As displaceable locking member 128 is forced in the direction indicated by the arrow F in FIG. 7B-1, the legs 129a, 129b thereof are spread apart because the width of tapered segment 136a is narrower than the diameter of the crimp 26 indicated by dash line circle 126'. This forces legs 129a, 129b apart in the directions shown by, respectively, arrows a and b in FIG. 7B-2 and when displaceable locking member 128 reaches its locking position, the protrusions 129a', 129b' are forced into detents 137a, 137b, thereby firmly retaining detonator 20 and displaceable locking member 128 within body 112.

It will further be appreciated that the construction and method of assembly described above in connection with connector blocks and detonators is broadly applicable to use with articles other than connector blocks. The invention thus broadly encompasses any structure comprising a body member having receiving means, i.e., an aperture chamber or channel formed therein, which is dimensioned and configured to receive and retain therein a mountable member, and a displaceable locking member integrally molded therewith and connected thereto by frangible web means. One such other use is illustrated in FIGS. 10, 11 and 12, wherein is shown another embodiment of the present invention in which the body member comprises a handle member 50 such as a handle suitable for an awl, pick or screwdriver. Handle member 50 has receiving means comprising a channel 52 (FIGS. 10 and 12) formed therein and terminating in a stop member comprising a channel end 52b within the interior of handle member 50. Channel 52 is dimensioned and configured to receive a mountable member which, in the illustrated embodiment, comprises an awl blade 54 having a tip end 54a and a mounting end 54b. The awl blade 54 also has first engagement means formed thereon comprising a circumferential groove 56. The cross-sectional profile of channel 52 is preferably polygonal, e.g., square in the illustrated embodiment, in order to prevent rotation of awl blade 54 relative to handle member 50. At least that portion of the awl blade 54 (the mountable member) to be received within channel 52 (the receiving means) is of substantially congruent cross-sectional configuration. Thus, in the illustrated embodiment, that portion of awl blade 54 between circumferential groove 56 and mounting end 54b is, like channel 52, square in cross section so that when mounted in handle member 50, awl blade 54 cannot rotate relative thereto.

A portion of channel 52 of handle member 50 lies within a handle shaft 52a which has a radially extending passageway 58 (FIG. 12) formed therein and intersecting channel 52. A displaceable locking member 60 is mounted within a first section of passageway 58 by frangible web means (not numbered and not clearly visible in FIGS. 10–12) which correspond to the frangible web means 30a, 30b, 30a' and 30b' of the connector block embodiments. Displaceable locking member 60 is provided with larger and smaller circular segment cutouts analogous to those illustrated as circular segments 36a' and 36b' of the embodiment of FIG. 5D.

In order to assemble the tool, awl blade 54 is inserted into channel 52 as indicated by the arrow I in FIG. 10 and, when the mounting end 54b of awl blade 54 abuts the channel end 52b of channel 52, circumferential groove 56 is properly aligned with displaceable locking member 60 so that, upon the application of a force as indicated by the arrow F in FIG. 10 sufficient to rupture the frangible web means (not shown in FIGS. 10–12) which hold displaceable locking member 60 in place, displaceable locking member 60 is forced from its first position to its locking position and the over-center configuration of the circular segments of displaceable member 60 snap-fit over circumferential groove 56 in a manner analogous to that in which the displaceable locking member of the other embodiments engages the crimp 26 of the detonator 20. The dimensions of circumferential groove 56, passageway 58 and locking member 60 is such that locking member 60 is force-fit onto groove 56 and is placed under compression in passageway 58. In this way, the awl blade 54 is firmly secured in place within handle 50 to provide a fully assembled hand tool. Obviously, tip end 54a could be differently configured to provide a blade or Philips-type screwdriver, a chisel, or any other desired tool configuration.

The advantages of the integrally molded construction of displaceable locking means 60 on tool handle 50 are similar to those described above in connection with the connector block aspects of the invention, in that displaceable locking means 60 is perfectly positioned and aligned with passageway 58 by virtue of being integrally molded therewith, and the need to handle, position and hold a separate piece is eliminated by the integral construction thereof.

Generally, and preferably, the passageway within which the displaceable member is to be received, e.g., passageways 38, 38', 58 and 138, is dimensioned and configured so that when the displaceable member, e.g., displaceable locking members 28, 28', 28", 60, is forced from its first position to its locking position, the displaceable locking member will be placed under compression between the walls of the passageway and the mountable member such as detonator 20 or awl blade 54, so that both the displaceable locking member and the mountable member are firmly retained in place. It will be appreciated that devices such as detent means, one-way barbs or the like may be utilized to help insure that the displaceable locking member, and thereby the mountable member, is permanently secured in place once the displaceable locking member is pushed to its locking position.

While the invention has been described in connection with specific preferred embodiments thereof, it will be apparent that the invention is applicable to a broad range of articles and is not limited to connector blocks and tool handles.

What is claimed is:

1. A molded plastic article comprising a body member having receiving means comprising a bore formed within the body member, the bore having a longitudinal axis and being dimensioned and configured to receive and retain therein a mountable member having at least a part thereof dimensioned and configured to be received within the bore, the mountable member having first engagement means formed thereon, the first engagement means being dimensioned and configured to be engaged by second engagement means whereby the mountable member is retained on the body member;

at least one displaceable member having the second engagement means formed thereon, the displaceable member being integrally molded with the body member and connected thereto by frangible web means which retain the displaceable member in a first position in which the displaceable member is aligned with but displaced from a locking position in which the second engagement means of the displaceable member engages the first engagement means of such mountable member, the displaceable member being displaceable in a direction transverse to the longitudinal axis of the bore from its first position to its locking position by application of force to the displaceable member to rupture the frangible web means and move the displaceable member in said direction to force the first and second engagement means into locking engagement with each other.

2. The article of claim 1 in combination with the mountable member, the mountable member being received within the receiving means.

3. A molded plastic article comprising a body member having receiving means comprising a bore formed within the body member, the bore having a longitudinal axis and having a mountable member received therein, the mountable member having at least a part thereof dimensioned and configured to be received within the bore and further having first engagement means formed thereon;

at least one displaceable member having second engagement means formed thereon, the displaceable member having initially been integrally molded with the body member so as to have been connected thereto by frangible web means which retained the displaceable member in a first position in which the displaceable member was aligned with but displaced from a locking position in which the second engagement means of the displaceable member engages the first engagement means of the mountable member, the frangible web means having been ruptured in the course of displacing the displaceable member in a direction transverse to the longitudinal axis of the bore from its first position to its locking position by application of force to the displaceable member to rupture the frangible web means and move the displaceable member in said direction to its locking position, in which the first and second engagement means are in locking engagement with each other.

4. The article of claim 1, claim 2 or claim 3 wherein the body member further comprises a passageway formed therein and extending transversely of the longitudinal axis of the bore for movement therethrough of the displaceable member from its first position to its locking position.

5. A molded plastic article comprising a body member having receiving means which are dimensioned and configured to receive and retain therein a mountable member comprising a detonator having thereon first engagement means comprising a crimp formed in the detonator;

at least one displaceable member having second engagement means formed thereon, the displaceable member being integrally molded with the body member and connected thereto by frangible web means which retain the displaceable member in a first position in which the displaceable member is aligned with but displaced from a locking position in which the second engagement means of the displaceable member engages the crimp of the detonator, the displaceable member being displaced from its first position to its locking position by application of force to the displaceable member to rupture the frangible web means and move the displaceable member to force the crimp and the second engagement means into locking locking engagement with each other.

6. The article of any one of claims 1, 2, 3 or 5 wherein the body member further comprises a passageway formed therein for movement therethrough of the displaceable member from its first position to its locking position, the displaceable member being at least partly retained within the passageway when in its locking position.

7. A molded plastic connector block for retaining at least one signal transmission line in signal transfer relationship with a detonator having an output end, the connector block comprising:

a body member having a signal transmission end and a channel formed in the body member for receiving and retaining therein such detonator with the output end thereof disposed at the signal transmission end of the body member;

a line retaining means disposed at the signal transmission end of the body member for retaining therein such at least one signal transmission line in signal communication relationship with the output end of such detonator retained within the receiving channel:

a displaceable locking member integrally molded with the body member and connected thereto by frangible web means which retain the displaceable locking member in a first position in which the locking member is aligned with but displaced from a locking position in which the locking member secures the detonator within the channel, the locking member being displaceable from its first position to its locking position by application of force to the locking member to rupture the frangible web means and move the displaceable locking member to force the locking member into its locking position.

8. The connector block of claim 7 wherein the body member further comprises a passageway formed therein for movement therethrough of the displaceable locking member from its first position to its locking position, the locking member being at least partly retained within the passageway when in its locking position.

9. The connector block of claim 9 wherein the line retaining means comprises a gripping member spaced from the signal transmission end of the body member to form a line-receiving slot between the gripping member and the signal transmission end of the body member, the line-receiving slot having an opening thereto and being otherwise dimensioned and configured to receive and retain therein such at least one signal transmission line in signal communication relationship with a detonator disposed in the channel as aforesaid, the gripping member having a supported end extending from the body member and a distal end which terminates in a return-bend leg which overlaps at least a portion of the length of the body member from the signal transmission end thereof and is disposed on the side of the body member opposite the side from which the supported end extends.

10. The connector block of claim 9 wherein the opening of the line-receiving slot defines a gap which is smaller in depth than the depth of the line-receiving slot.

11. The connector block of claim 7, claim 8 or claim 9 in combination with the detonator received within the channel with the output end of the detonator at the signal transmission end of the body member.

12. The connector block of claim 11 wherein the detonator has a crimp formed therein and the locking member has crimp-engaging means formed thereon which engage the crimp of the detonator when the displaceable locking means is in its locking position.

13. The connector block of claim 12 wherein the crimp-engaging means of the displaceable locking member comprises a pair of spaced-apart leg members which define between them an aperture which is dimensioned and configured to resiliently snap onto the crimp of the detonator.

14. The connector block of claim 13 wherein the frangible web connects each of the leg members to the body member.

15. The connector block of claim 12 wherein the at least one signal transmission line comprises a plurality of signal transmission lines and the line retaining means is dimensioned and configured to retain such plurality of signal transmission lines in signal communication relationship with the detonator.

16. A method of mounting a mountable member having first engagement means thereon in a molded plastic body member, which body member has receiving means comprising a channel formed within the body member and having a longitudinal axis, the channel being dimensioned and configured to receive and retain therein the mountable member;

the body member comprising at least one displaceable member having second engagement means formed thereon, the displaceable member being integrally molded with the body member and connnected thereto by frangible web means which retain the displaceable member in a first position in which the displaceable member is aligned with, but displaced from, a locking position in which the second engagement means of the displaceable member engages the first engagement means of the mountable member the method comprising:

rupturing the frangible web means and moving the displaceable member along a travel path which is transverse to the longitudinal axis of the channel and into contact with the mountable member so as to force the first and second engagement means into locking engagement with each other.

17. The method of claim 16 including moving the displaceable member along a linear travel path.

18. The method of claim 17 including moving the displaceable member without tilting or rotation thereof.

19. A method of mounting a detonator having first engagement means thereon in a molded plastic connector block having at least one displaceable locking member having second engagement means formed therein, the connector block comprising a body member having a channel which is dimensioned and configured to receive and retain therein the detonator, the displaceable locking member being integrally molded with the body member and connected thereto by frangible web means which retain the displaceable locking member in a first position in which the displaceable locking member is aligned with, but displaced from, a locking position in which the second engagement means of the displaceable locking member engages the first engagement means of the detonator, the method comprising:

rupturing the frangible web means and moving the displaceable locking member along a travel path into contact with the detonator to force the first and second engagement means into locking engagement with each other to thereby retain the detonator within the connector block.

20. The method of any one of claims 16, 17, 18 or 19 wherein the body member comprises a passageway formed therein for movement therethrough of the displaceable locking member from its first position to its locking position, the locking member being at least partly retained within the passageway when in its locking position.

21. A connector block for retaining at least one signal transmission line in signal transfer relationship with a detonator having an output end, the connector block comprising:

a body member having a signal transmission end and a channel formed in the body member for receiving such detonator;

means carried on the body member to retain such detonator within the channel with the output end of the detonator disposed at the signal transmission end of the body member;

a resilient, cantilevered member comprising a shank having a fixed end extending from one side of the body member at a support location on the body member which is remote from the signal transmission end thereof, and an opposite end carrying a gripping member spaced from the signal transmission end of the body member to form a line-receiving slot between the gripping member and the signal transmission end of the body member, the gripping member being fixed relative to the body member whereby an opening to the line-receiving slot is provided, which opening is not closeable by the gripping member, the line-receiving slot being dimensioned and configured to receive and retain therein such at least one signal transmission line in signal communication relationship with such detonator disposed in the channel as aforesaid.

22. The connector block of claim 21 wherein the gripping member has a supported end extending from the shank and a distal end which terminates in a return-bend leg which extends along at least a portion of the length of the body member from the signal transmission end thereof and is disposed on the side of the body member opposite the side from which the shank extends.

23. A connector block for retaining at least one signal transmission line in signal transfer relationship with a detonator having an output end, the connector block comprising:

a body member having a signal transmission end and a channel formed in the body member for receiving such detonator;

means carried on the body member to retain such detonator within the channel with the output end of the detonator disposed at the signal transmission end of the body member;

a resilient, cantilevered member comprising a shank having a fixed end extending from one side of the body member at a support location on the body member which is remote from the signal transmission end thereof, and an opposite end carrying a gripping member spaced from the signal transmission end of the body member to form a line-receiving slot between the gripping member and the signal transmission end of the body member, the line-receiving slot being dimensioned and configured to receive and retain therein such at least one signal transmission line in signal communication relationship with such detonator disposed in the channel as aforesaid, the shank being spaced from the body member and extending generally parallel thereto to define a second slot extending between the shank and the body member; and the gripping member having a supported end extending from the shank and a distal end which terminates in a return-bend leg which extends along at least a portion of the length of the body member from the signal transmission end thereof and is disposed on the side of the body member opposite the side from which the shank extends.

24. A connector block for retaining at least one signal transmission line in signal transfer relationship with a detonator, the connector block comprising:

a body member having a signal transmission end and a channel formed in the body member for receiving and retaining therein such detonator having an output end, with the output end disposed at the signal transmission end of the body member;

a gripping member disposed adjacent to and spaced from the signal transmission end of the body member to form a line-receiving slot between the gripping member and the signal transmission end of the body member, the gripping member being fixed relative to the body member whereby an opening to the line-receiving slot is provided, which opening is not closeable by the gripping member and is otherwise dimensioned and configured to provide access for the line-receiving slot to receive and retain therein such at least one signal transmission line in signal communication relationship with such detonator disposed in the channel as aforesaid, the gripping member having a supported end extending from the body member and a distal end which terminates in a return-bend leg which overlaps at least a portion of the length of the body member from the signal transmission end thereof and is disposed on the side of the body member opposite the side from which the supported end extends.

25. The connector block of claim 24 wherein the opening of the line-receiving slot defines a gap which is smaller in depth than the depth of the line-receiving slot.

26. A molded plastic connector block in combination with a detonator having anoutput end, the connector block being adapted for retaining at least one signal transmission line in signal transfer relationship with the detonator, the connector block comprising a body member having a signal transmission end and a channel formed in the body member, the detonator being retained within the channel, with the output end of the detonator disposed at the signal transmission end of the body member;

a line retaining means disposed at the signal transmission end of the body member for retaining therein such at least one signal transmission line in signal communication relationship with the output end of the detonator;

a displaceable locking member having initially been integrally molded with the body member and connected thereto by frangible web means which retained the displaceable locking member in a first position in which the locking member was aligned with but displaced from a locking position in which the locking member secures the detonator within the channel, the frangible web means having been ruptured to displace the locking member from its first position to its locking position by application of force to the locking member to rupture the frangible web means and move the displaceable locking member to force the locking member into its locking position.

27. The combination of claim 26 wherein the detonator has first locking means thereon comprising a crimp formed in the detonator and the displaceable locking member has thereon second locking means engaged with the crimp.

* * * * *

UNITED STATES PATENT AND TRADEMARK OFFICE
CERTIFICATE OF CORRECTION

PATENT NO.  : 5,499,581
DATED       : March 19, 1996
INVENTOR(S) : Daniel P. Sutula, Jr.

It is certified that error appears in the above-indentified patent and that said Letters Patent is hereby corrected as shown below:

In column 1, line 59, remove the hyphen in "trunk-line".

In column 11, line 2, replace "spacedapart" with --spaced-apart--.

In claim 5, column 15, line 60, remove one instance of "locking".

In claim 9, column 16, line 31, change the dependency of claim 9 from claim 9 to claim 7.

In claim 16, column 17, line 19, insert a comma after "member".

In claim 26, column 19, line 22, insert a space between "an" and "output".

Signed and Sealed this

Twelfth Day of November, 1996

Attest:

BRUCE LEHMAN

*Attesting Officer*   *Commissioner of Patents and Trademarks*